United States Patent Office 3,132,630
Patented May 12, 1964

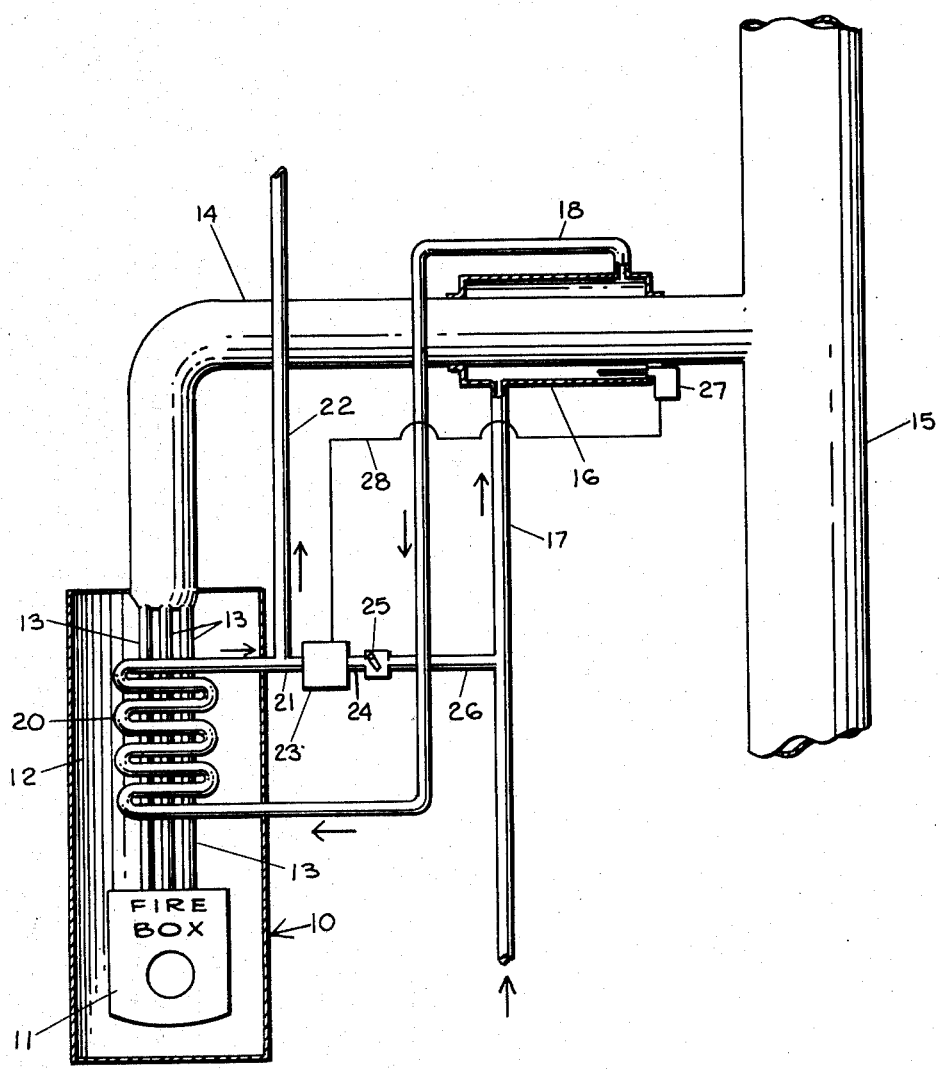

3,132,630
WASTE HEAT UTILIZING SYSTEM
FOR BOILERS
Francis Pizzulo, 2488 SW. 19th Terrace, Miami, Fla.
Filed May 1, 1962, Ser. No. 191,569
2 Claims. (Cl. 122—33)

This invention relates to a water preheating device and is more particularly directed to a waste heat utilizing system connected to a boiler for heating and domestic uses.

In general this invention consists of a water jacket mounted on a flue for preheating water in the jacket. As the water becomes heated it flows to a tankless coil in a boiler where the preheated water is then heated to a desired temperature and discharged therefrom to the many domestic uses in the home. In the event this heated water for domestic use is not withdrawn from the system in sufficient amount, an aquastat will be triggered upon the water in the water jacket reaching a certain temperature and a circulating pump will become actuated. The pump will reverse the normal flow of water in this system causing the heated water in the water jacket to flow to the tankless coils to give off its excess heat to the water in the boiler and return to the water jacket to pick up more heat from the escaping flue gases. When water is once again drawn off for domestic use, the temperature of the water in the water jacket will drop and the aquastat will be inactivated to cease the operation of the circuating pump. The normal flow of water in the preheater system will then be resumed.

Therefore, a principal object of the present invention is to provide a water preheating system for a boiler which causes a forced flow of water when the water in the system reaches a certain high temperature to give off its heat to the boiler water.

Another object of the present invention is to provide a waste heat utilizing system for boilers which system utilizes the preheated water to heat the boiler water whenever failure to use the preheated water causes the latter to rise to a designated high temperature.

A still further object of the present invention is to provide a waste heat utilizing system for boilers wherein waste flue gas heat is utilized to preheat water for domestic use which is to be heated to its proper temperature by heat exchange in a boiler used for heating purposes.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

The single FIGURE of the drawing is a schematic diagram of a waste heat utilizing system for boilers embodying my invention.

In the drawing, there is shown a conventional boiler 10 normally used for providing heated water or steam for heating a building, etc. and consisting of a firebox 11 and a tank portion 12 for containing water heated by heat emanating from the fire box and from gases passing through flue passages 13 to be discharged into the main discharge flue 14. The flue 14 extends to a chimney 15 where the gases are discharged to the atmosphere.

Mounted about the main flue 14 is a water jacket 16 provided with a water inlet pipe 17 at one end on its lower side and a water outlet pipe 18 at the other end at its upper side. The water jacket inlet pipe 17 is connected to a source of water while the outlet pipe 18 is connected to the low side of a tankless coil 20 mounted in the boiler 10 in heat exchange relation with the water in the tank 12 of the boiler 10. The high side of the coil 20 is connected to a pipe 21 with a branch pipe 22 connected thereto for conveying heated water for domestic uses. The pipe 21 is connected to a circulating pump 23 whose discharge flows through a pipe 24 which is connected to a check valve 25. The outlet of the check valve 25 is in turn connected to a pipe 26 which is connected to the inlet water line 17. An aquastat 27 which is positioned in the water jacket 16 is connected electrically by a wire 28 to the circulator 23.

When the water in the water jacket 16 has reached a certain high temperature the aquastat 27 will energize the circulator 23 causing the latter to pump water from the tankless coil 20 through the check valve 25 into the pipe line 17, and to the water jacket 16. The hot water in the water jacket 23 will flow out of the jacket 16 through the water pipe 18 and into the tankless coil 20, thus effecting a forced flow of water in the preheating water system.

In the normal operation of my water preheating system water from a cold water feed will flow through the pipe 17 into the water jacket 16 where it will become heated by the waste gases generated in the boiler 10 and flowing through the flue 14 to the chimney 15. The preheated water in the jacket 16 will leave the jacket 16 through the outlet pipe 18 and into the coils 20 to receive heat from the hot water in the tank 12 and the hot gases generated in the fire box 11. The heated water will leave the coils 20 through the outlet line 21 and to the domestic use line 22 where hot water is distributed to the various domestic uses in the house. As long as the hot water in my preheating system does not reach a certain temperature, the system will operate as indicated herein. However, if the temperature of the water in the water jacket 16 reaches a certain high temperature, due to failure to draw off sufficient hot water from the coils 20 for domestic uses, the aquastat 27 will energize the circulator 23 and cause an enforced circulation of hot water in my system. The circulator 23 will pump water from the coils 20 through the line 21, the check valve 25, into the inlet pipe 17 and into the water jacket 16. The extremely hot water in the water jacket 16 will be discharged through the outlet pipe 18 and into the tankless coil 20 where the hot water will radiate and relinquish its excessive heat to the surrounding boiler water 12 in the boiler 10. As the water flows through the coil 20 it will drop in temperature and is against pumped by the circulator 23 back to the water jacket 16 where it will pick up more heat from the hot gases passing through the flue 14. As soon as hot water is again drawn from the system for domestic uses through the the pipe 22 and the temperature of the water in the water jacket 16 has dropped to below the aquastat actuating temperature, the circulator 23 will become de-energized and the water in the preheating system will flow as first stated hereinabove and shown by arrows in the drawing. Without the aquastat 27, the circulator 23 and the check valve 25, the excessively heated water in the water jacket 16 would be wasted by normal radiation or by having to be purged from the system to prevent an explosion.

Having described my invention, what I claim as new and desire to secure by Letters Patent Patent of the United States is:

1. In a heating system having a boiler, a water compartment in said boiler and a flue for discharging gases from said boiler, the combination comprising a water jacket mounted in heat exchange relation with said flue, said water jacket having an inlet and an outlet, a tankless coil immersed in said water compartment in said boiler, said tankless coil having an inlet and an outlet, pipe means connecting said outlet of said water jacket with said inlet of said tankless coil, further pipe means connecting said outlet of said tankless coil for discharging water from said system, still further pipe means connecting said outlet of said tankless coil and said inlet of said water jacket, a check valve in said last named pipe means preventing the flow of water from said inlet of said water jacket to said outlet of said tankless coil, a circulator pump mounted on said last named pipe means in proximity of said check valve for discharging water from said tankless coil through said outlet pipe to said inlet of said water jacket and means for actuating said circulator pump.

2. In a heating system having a boiler, a water compartment in said boiler and a flue for discharging gases from said boiler, the combination comprising a water jacket mounted in heat exchange relation with said flue, said water jacket having an inlet and an outlet, a tankless coil immersed in said water compartment in said boiler, said tankless coil having an inlet and an outlet, pipe means connecting said outlet of said water jacket with said inlet of said tankless coil, further pipe means connecting said outlet of said tankless coil for discharging water from said system, still further pipe means connecting said outlet of said tankless coil and said inlet of said water jacket, a check valve in said last named pipe means preventing the flow of water from said inlet of said water jacket to said outlet of said tankless coil, a circulator pump mounted on said last named pipe means in proximity of said check valve for discharging water from said tankless coil through said outlet pipe to said inlet of said water jacket, an aquastat mounted in said water jacket, and means connecting said aquastat and said circulator pump whereby when the water in said water jacket reaches a designated high temperature the circulator pump is actuated to pump water from the tankless coil through said outlet, past said check valve and into said inlet of said water jacket while the excessively hot water from said water jacket will flow through its outlet and into said inlet of said tankless coil.

References Cited in the file of this patent
UNITED STATES PATENTS

| | | |
|---|---|---|
| 448,932 | Cavanagh | Mar. 24, 1891 |
| 2,189,749 | Windheim et al. | Feb. 13, 1940 |